INVENTOR.
GEORGE J. LINDER, JR.

BY LACKENBACH & SIEGEL

ATTORNEYS

Feb. 6, 1968  G. J. LINDER, JR  3,367,252

PHOTOGRAPHIC APPARATUS

Filed Aug. 16, 1965  6 Sheets-Sheet 3

*INVENTOR.*
GEORGE J. LINDER, JR.

BY LACKENBACH & SIEGEL
ATTORNEYS

Feb. 6, 1968  G. J. LINDER, JR  3,367,252
PHOTOGRAPHIC APPARATUS
Filed Aug. 16, 1965  6 Sheets-Sheet 3

INVENTOR.
GEORGE J. LINDER, JR.

BY LACKENBACH & SIEGEL

ATTORNEYS

INVENTOR.
GEORGE J. LINDER, JR.

BY LACKENBACH & SIEGEL
ATTORNEYS 3,367,252
PHOTOGRAPHIC APPARATUS
George J. Linder, Jr., Mineola, N.Y., assignor to Camera Corporation of America, Hicksville, N.Y., a corporation of New York
Continuation-in-part of application Ser. No. 171,988, Feb. 8, 1962. This application Aug. 16, 1965, Ser. No. 480,046
21 Claims. (Cl. 95—13)

This application is a continuation-in-part of my co-pending application Ser. No. 171,988, filed Feb. 8, 1962, entitled "Magazine for a Camera," and now Patent No. 3,200,725.

The present invention pertains, generally, to photography, and more particularly to photographic apparatus that is constructed and arranged to enable a user of the apparatus to cause the exposure of photosensitive material and its subsequent development all prior to its removal from said apparatus with maximum ease, facility and readiness.

It is, therefore, a primary object of the present invention to provide photography apparatus particularly adapted to co-operate with a disposable unitary cartridge having a supply of photosensitive material therewithin, said cartridge being constructed and arranged to enable a user to cause the exposure of said material and its subsequent development all prior to its removal from the apparatus with maximum ease, facility and readiness.

Another primary object of this invention, in addition to the foregoing objects, is to provide unitary self-contained photographic apparatus that enables a user to cause the exposure of photosensitive material and its subsequent development prior to removing the material from the apparatus with optimum efficiency and maximum ease, readiness and facility, said apparatus comprising a unitary self-contained disposable cartridge having a supply of said material and the requisite developing solution or solutions therewithin, and an enclosure in which said cartridge is particularly adapted to be removably disposed.

Yet another primary object of the present invention, in addition to each of the foregoing objects, is to provide unitary self-contained photographic apparatus comprising the combination of a camera housing or enclosure and a unitary self-contained disposable cartridge having a supply of photosensitive material and the requisite developing solution or solutions disposed therewithin particularly adapted to be removably disposed within the cartridge, said housing or enclosure comprising an image transfer assembly for transferring a virtual image to said photosensitive material, said image transfer assembly and said cartridge being constructed and arranged to co-operate with one another to define the location of said cartridge within the housing.

A further primary object of this invention, in addition to each of the foregoing objects, is to provide photography apparatus comprising an enclosure or housing and a self-contained disposable unitary cartridge having a supply of photosensitivve material and a supply of developing solution or solutions in combination therewith, said housing or enclosure comprising an access door having a mounting assembly for removably and pivotally mounting said door upon said enclosure or housing, said mounting assembly being constructed and arranged to facilitate assembly and disassembly of said photographic apparatus, and the operation of said door.

A further primary object of the present invention, in addition to each of the foregoing objects, is to provide photographic apparatus comprising an enclosure or housing and a self-contained disposable unitary cartridge having a supply of photosensitive material and a supply of developing solution or solutions disposed therewithin particularly adapted to be removably disposed within the housing, said housing or enclosure having a removable pivotable access door comprising a photosensitive material or film positioning assembly that is constructed and arranged to enable a user to accurately and efficiently, and with maximum ease, facility and readiness, locate successive portions of said photosensitive material or film first at an image plane of said cartridge, at which the successive portions are particularly adapted to be exposed to a subject image, thence within a liquid-type chamber within which the exposed portion of the photosensitive material or film is particularly adapted to be developed before the next successive portion of the film is disposed at the image plane for exposure to another subject image, and definably at a location in which the developed portion of the film has been severed from the remainder of the photosensitive material, at which latter location the next successive portion of the material or film for exposure to a subject image has been located at the image plane.

An additional primary object of this invention, in addition to each of the foregoing objects, is to provide photographic apparatus comprising an enclosure or housing and a self-contained disposable unitary cartridge having a supply of photosensitive material and a supply of developing solution or solutions disposed therewithin particularly adapted to be removably disposed within the housing, said housing or enclosure having a removable pivotable access door comprising a photosensitive material or film positioning assembly that is constructed and arranged to enable a user to accurately and efficiently, and with maximum ease, facility and readiness, locate successive portions of said photosensitive material or film first at an image plane of said cartridge, at which the successive portions are particularly adapted to be exposed to a subject image, thence within a liquid-type chamber within which the exposed portion of the photosensitive material or film is particularly adapted to be developed before the next successive portion of the films is disposed at the image plane for exposure to another subject image, and definably at a location in which the developed portion of the film has been severed from the remainder of the photosensitive material, at which latter location the next successive portion of the material or film for exposure to a subject plane has been located at the image plane, said film positioning assembly comprising an assembly for severing successive portions of the photosensitive material or film subsequent to the development of each of the exposed portions.

A further primary object of this invention, in addition to each of the foregoing objects, is to provide a method for accurately locating and efficiently translating successive portions of a direct-positive type of photosensitive material or film at and between an image plane, at which the portions are particularly adapted to be exposed to a subject image, thence into a liquid-type container of a unitary self-contained disposable cartridge, within which the exposed portion of the material or film is particularly adapted to be developed before the next successive portion of the material or film is translated to the image plane, and finally to a location at which the developed portion of the material or film can be severed from the remainder thereof, in which latter location the next successive portion of the film to be exposed to a subject image is located at the image plane.

Other objects and important features of the present invention will be apparent from a study of the specification following taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

Figure 1:
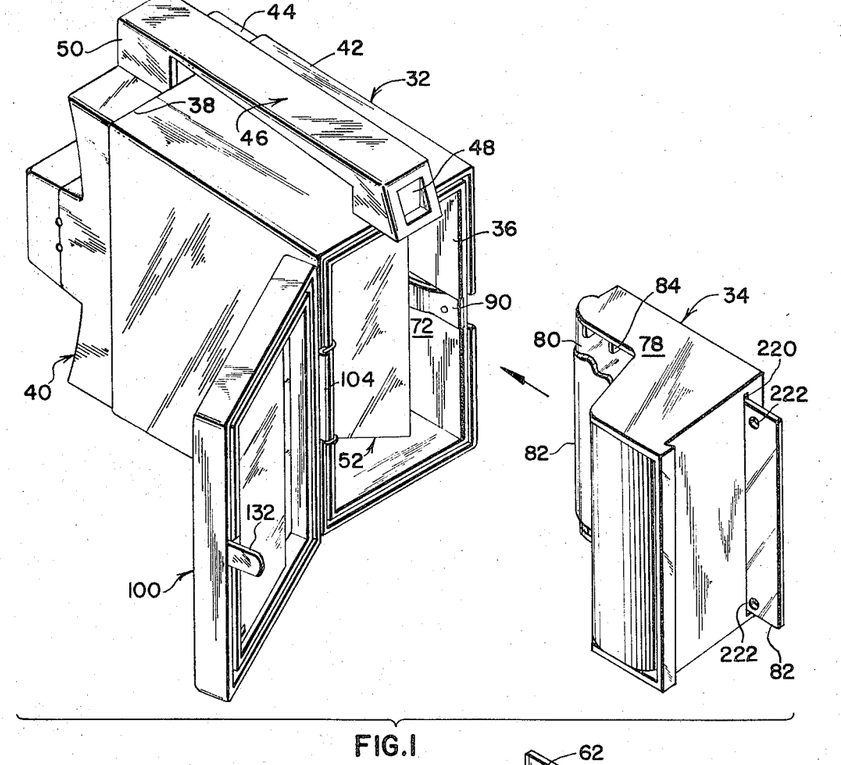
FIGURE 1 is an exploded perspective view of photographic apparatus constructed in accordance with the principles of the present invention, illustrating the self-contained unitary disposable cartridge particularly adapted to cooperate therewith for the exposure and subsequent development of photosensitive material or film before the latter is removed from the apparatus.

With reference now to the drawings, and particularly to FIGURE 1 thereof, there is illustrated therein photographic apparatus constructed in accordance with the principles of the present invention, and generally designated by the reference character 30. The photographic apparatus or camera 30, which is constructed and arranged to expose successive portions of photosensitive material or film to a subject image, and to successively develop such portions before exposing the next successive portion all before they are each removed from the camera, comprises an enclosure or housing 32 and a self-contained unitary disposable cartridge 34. The cartridge 34 is shown, illustrated and described and disclosed in the co-pending application identified above. Accordingly, since reference may be had thereto for a detailed description of the cartridge, it is not deemed necessary to present such a detailed description herein. Nevertheless, the cartridge 34 will be shown, illustrated, described and disclosed to the extent necessary to provide a clear understanding of the present invention. In this latter connection, it will be understood that the self-contained unitary disposable cartridge 34 is particularly adapted to be used with conventional types of direct positive film, such as, and by way of example only, films having a diazonium photosensitive layer, or having two image forming materials on a single backing web of material. A negative image will thus be formed in one image forming material by means of a direct photosensitive process, and a positive image formed in the second image forming material by means of a diffusion transfer process, the negative image forming material and the positive image forming material being either combined within a single layer of emulsion or being in separate superposed layers of emulsion on a single web of backing material. The cartridge will also contain a suitable processing material comprising the required solution or solutions rendering the film capable of producing a positive image completely within the cartridge.

The housing or enclosure 32, which is of generally rectangular construction, comprises one end or a rear end 36 that is open and substantially unobstructed. The housing or enclosure 32 comprises another or front end 38. A lense and shutter system or assembly 40, which may be of any suitable and conventional construction, is fixedly positioned upon the housing 32 at the front end 38 thereof.

The housing 32 and the lense and shutter assembly 40 each comprise a top wall 42 and 44, respectively. A handle 46 is mounted on the camera 30 at the top thereof, and at one end is fixedly positioned upon the top wall 42 of the housing 32, and at another end thereof, is fixedly positioned on the top wall 44. The handle 46 is constructed and arranged to define a view-finding assembly having a rear view finder 48 and a front view finder 50 in alignment with one another.

Figure 2:
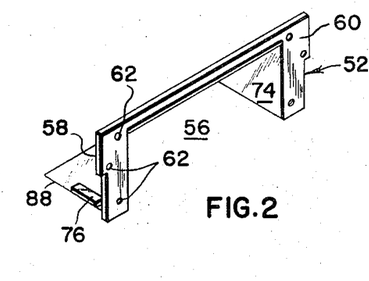
FIGURE 2 is a perspective view of an image transfer assembly for transferring a subject image to the photosensitive material or film located at the image plane of the cartridge shown in FIGURE 1.
Figure 3:
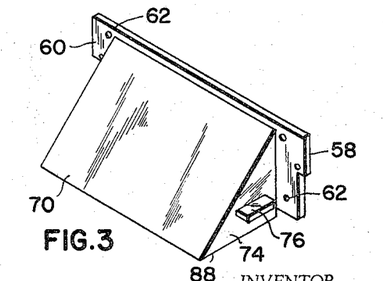
FIGURE 3 is a view similar to FIGURE 2, but taken at a different angle.
Figure 4:
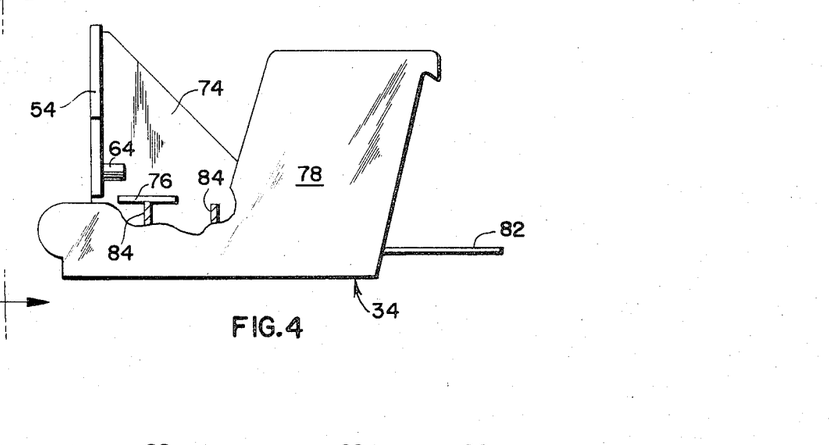
FIGURE 4 is a side elevational assembly view, illustrating the manner in which the image transfer assembly shown in FIGURES 2 and 3 and the cartridge shown in FIGURE 1 cooperate with one another.

An image transfer assembly, generally designated by the reference character 52, is fixedly mounted in the housing or enclosure 32. With particular reference now to FIGURES 2–4, the image transfer assembly will be seen to comprise a mounting wall 54 that, when viewed in elevation, defines an opening of U-shaped configuration.

Figure 6:
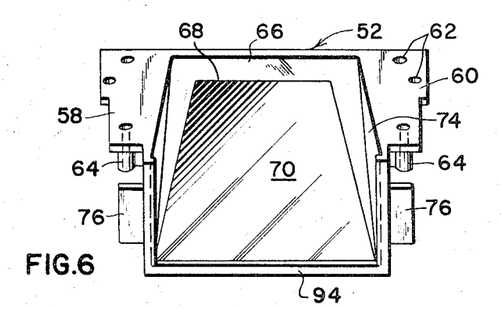
FIGURE 6 is an elevational view of the image transfer assembly, viewed in the same direction as in FIGURE 5, but wherein the assembly has been tilted upwardly from an horizontal plane to clearly illustrate certain details of construction.
Figure 7:
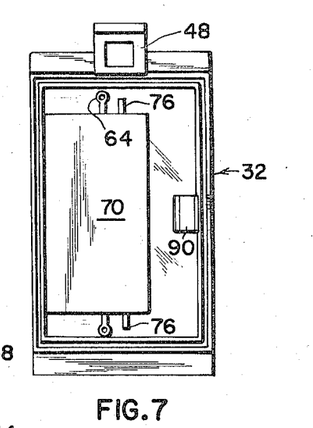
FIGURE 7 is a rear elevational view of the photographic apparatus, showing only the image transfer assembly in its position therewithin.
Figure 8:
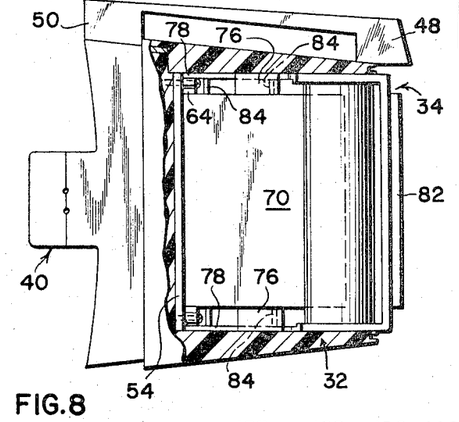
FIGURE 8 is a side elevational view of the photographic apparatus, partially broken away, to further illustrate the manner in which the image transfer assembly and the self-contained unitary disposable cartridge cooperate with one another when they are positioned therewithin.
Figure 9:
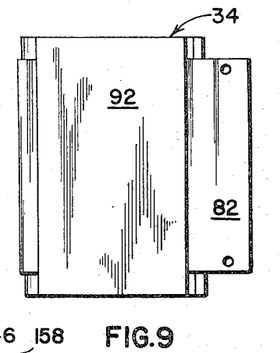
FIGURE 9 is a bottom plan view of the unitary self-contained disposable cartridge.

The wall 54 comprises a plurality of mounting ears 58 and 60 each having apertures 62 to be aligned with apertures in a wall (not shown) in the housing 32. As particularly shown in FIGURE 6, a boss 64 aligned with one of the apertures 62, extends from each mounting ear 58, 60. One of the fasteners (not shown) for mounting the image transfer assembly 52 in the housing 32 will co-operate with each of the bosses 64. The latter, therefore, function as braces, and insures that the image transfer assembly will occupy a stable position within the housing.

The image transfer assembly comprises an image transfer wall 66 that extends from the mounting wall 54 at an acute angle of 45 degrees with respect thereto. The wall 66 comprises an opening or aperture 68 of generally trapezoidal configuration. An image transfer element 70 is mounted upon the wall 66. As is considered readily apparent, the opening or aperture 68 will enable a substantial portion of the surface area of the element 70 to be exposed to the actinic light allowed to enter the housing 32 when the lense and shutter assembly 40 is operated. The image transfer element 70, by way of example only, may comprise a conventional mirror. The back or rear surface of the mirror 70, as viewed in FIGURE 3, is preferably covered with a backing material, for example, black paint, for a purpose that is considered readily apparent. With particular reference to FIGURE 1, it will be seen that the image transfer assembly 52 is positioned within the housing 32 so that any transfer of actinic light will be in a lateral direction towards a side wall 72 of the housing. The image transfer wall 66 therefore defines an acute angle of 45 degrees with a plane that is parallel with the front of the camera 30, and defines a similar angle with the side wall 72.

The image transfer assembly 52 comprises, further, side walls 74 that are of generally triangular configuration. Each side wall 74 comprises, in turn, locating or positioning guides or lugs 76 extending laterally outwardly therefrom. The guides or lugs 76 are particularly adapted to co-operate with the cartridge or magazine 34 in a manner to be described more fully hereinafter. In this connection, and as shown, illustrated, described and disclosed in the aforesaid co-pending application, the cartridge comprises side walls 78, and is constructed and arranged to define an image transfer plane 80 comprising, in part, the path of travel of photosensitive material or film 82. The walls 78 each comprise locating or positioning ears 84 extending laterally inwardly therefrom. The ears 84 are particularly adapted to guide the film 82 and traverses the image plane 80, and in addition are particularly adapted to co-operate with the lugs 76.

Figure 5:
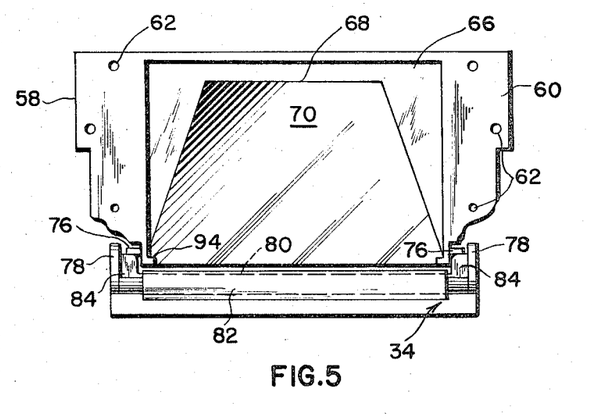
FIGURE 5 is another assembly view, similar to FIGURE 4, and taken along the line 5—5 thereof.

With particular reference now to FIGURE 5, it will be seen that the ears 84 perform a dual function. As pointed out above, they act as guides for the film as it traverses the image plane 80. In addition, they function to define the vertical position of the cartridge within the housing 32, to thus preclude any lateral displacement of the cartridge relative to the image transfer assembly 52. Accordingly, the transversed distance between the ears 84 is chosen to provide only a tolerance between them and the side walls 74 of the image transfer assembly, and the edges of the films 82.

With continued reference to that figure, it will be understood that a clearance is provided between the image transfer assembly and the image plane 80 of the cartridge 34 to provide a passage for the film 82 therebetween. This film passage, designated by the reference character 86, is a function of the distance from or between the lugs 76 and an edge 88 (see FIGURE 3) of the side walls 74. This is particularly true since the lugs 76 are particularly adapted to rest upon the ears 84 when the cartridge 34 is disposed in a co-operative position with the image transfer assembly 52. In order to firmly position the cartridge within the housing 32 so that the ears 84 will rest against the lugs 76, a resilient element or spring 90 is mounted upon the side wall 72 of the housing, and is particularly adapted to bear against or engage a surface 92 of the cartridge opposite the image plane 80. The cartridge, thus, in effect, functions as a pressure plate, and when the ears 84 abut against or engage the lugs 76, the film passage 86 results and is thus defined. To provide optimum results, it is of course desirable that the film 82 be flat as it traverses the image plane. To this end, the side walls 74 and the image transfer walls 66 of the assembly 52 are constructed and arranged to define a lip or ridge 94 of generally U-shaped configuration (see FIGURES 5 and 6). Accordingly, when the resilient element or spring 90 moves the cartridge so that the ears 84 engage the lugs 76, the film passage 86 is defined, the extent of which is hardly more than a tolerance. For all practical purposes, therefore, the lip 94 can be said to bear against the film 82 to hold it flat as it traverses the image plane 80, enabling the attainment of optimum results. While no specific dimensions have been given, it will be understood that they are of the utmost importance to the extent that they must be chosen to obtain the proper positioning and co-operation between the image transfer assembly 52 and the cartridge 34, and, in turn, optimum results.

As pointed out above, the photosensitive material or film 82 is of the direct-positive-type. It will now be understood, therefore, that the image transfer element 70 which, by way of example only, may comprise a mirror, is an essential element of the image transfer assembly 52. That is, the conventional lens and shutter assembly 40 will, in the ordinary camera, reverse the image in transferring the latter to the ordinary negative-type of film. The image must then again be reversed in developing the positive. In the present invention, since the film is a direct-positive-type, the subject image must be reversed in transferring it thereto. That is, it is a virtual image that is transferred to the film 82, and thus the necessity for the image transfer element 70. The particular position of the assembly 52 and the cartridge 34 within the housing 32 which transfers the subject image laterally of the housing to the film 82 enables the presentation of photographic apparatus or the camera 30 that is compact and easy to handle. At this point, it will be understood that the housing 32 comprises a stop (not shown) therewithin to define the innermost position of the cartridge 34, precluding the cartridge from hitting the image transfer assembly 52 and possibly damaging the element or mirror 70.

Figure 24:
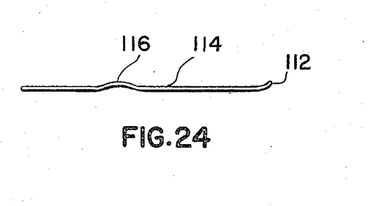
FIGURE 24 is an elevational view of the element shown in FIGURE 23.

The photographic apparatus or camera 30 comprises, further, an access door, generally designated by the reference character 100, which is particularly adapted to be removably and pivotably mounted or positioned upon the enclosure 32. This is accomplished by means of a door mounting assembly 102. The door mounting assembly comprises a boss 104 extending therefrom having a recess 106 at each end thereof. In the alternative, the boss 104 may simply have a passageway or bore (not shown) extending completely therethrough. The mounting assembly 102 further comprises a resilient element or spring 108 having a plurality of fingers 110 that are disposable within a corresponding one of the recesses 106. The spring 108 is of generally trapezoidal configuration in a normal unflexed position, and defines a bight 112 and a plurality of legs 114. As clearly illustrated in FIGURE 24, the bight 112 is turned upwardly from the plane in which the legs 114 lie. Each of the legs 114 comprise a raised portion 116 for a purpose hereinafter to be described.

The mounting assembly 110 further comprises a block or panel 118 which is positioned upon the other side wall 120 of the housing or enclosure 32. This side wall 120 has a recess 122 which extends inwardly of the housing or enclosure from the open end 36 thereof. The block or panel 118 extends completely across the recess 122, thus, in effect, substantially enclosing a portion thereof. It will now be understood that the resilient element or spring 108 is insertable within the recess 122. The legs 114 thereof will engage an upper wall 124 and a lower wall 126 of the recess, thus flexing the legs inwardly towards one another. The raised portions 116, which, like the bight 112, extend from the plane in which the legs 114 lie, will abut against the block or panel 118, thus precluding any movement of the spring 108 between the side wall 120 of the housing 32 and the panel. A space is defined between the panel 118 and an end 128 of the recess 122, into which the bight 112 is insertable. In particular, the bight is particularly adapted to be snap-fitted into this position, to thus preclude inadvertent movement of the resilient element along the recess.

Figure 22:
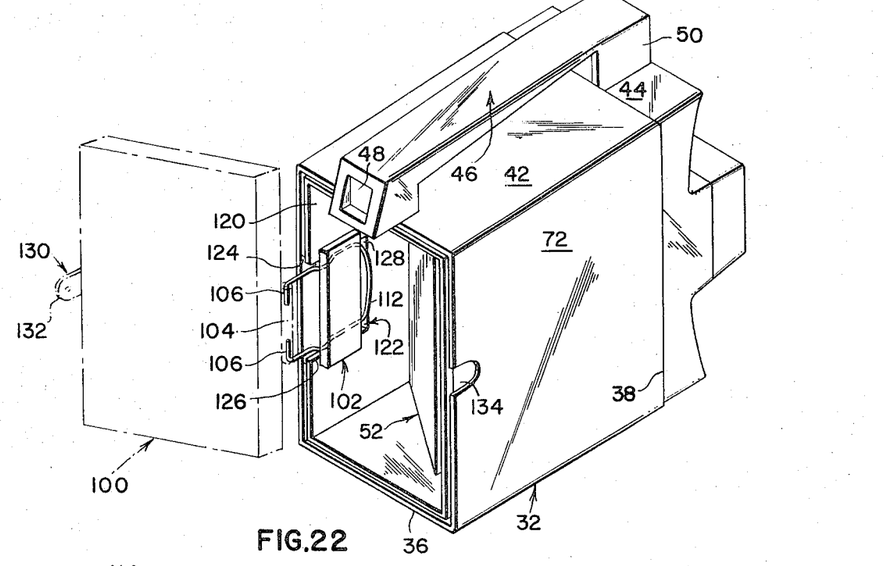
FIGURE 22 is a view similar to FIGURE 1, illustrating the assembly for pivotably removably mounting the access door upon the housing.
Figure 23:
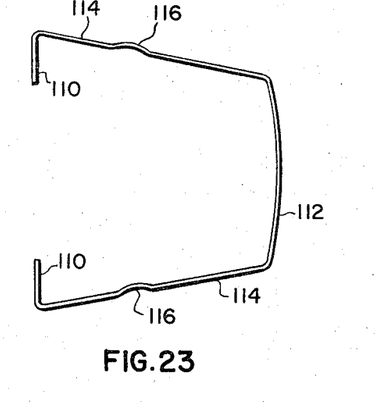
FIGURE 23 is a plan view of one of the elements of the mounting assembly shown in FIGURE 22.

It will now be understood that the mounting assembly 102 enables the access door 100 to be removably snap-fitted into a position with respect to the enclosure 32, in which position the door is pivotably movable between a closed position relative to the housing (see FIGURE 13) and an opened position with respect thereto (see FIGURES 1 and 22). Mounting the door is accomplished with facility by simply inserting the spring into the recess 122, until the bight 112 is snap-fitted into a position within the space between the panel 118 and the end wall 128 of the recess. The raised portions 116 and the bight 112 will cooperate with one another in retaining the spring in this position, with the raised portions causing the spring to be frictionally engaged with the wall 120 of the housing and with the panel. The door is removed with equal facility by simply placing a finger against the bight 112 and causing it to enter the space between the wall 120 and the panel 118. This may further be facilitated by pivoting the end of the spring having the fingers 110 towards the wall 72 of the housing 32. The access door 100 is particularly adapted to be maintained in its closed position with respect to the housing in any suitable manner, as through the medium of a conventional closure assembly 130 having male and female closure elements 132 and 134, respectively.

Figures 10, 11, 12, 13, 17:
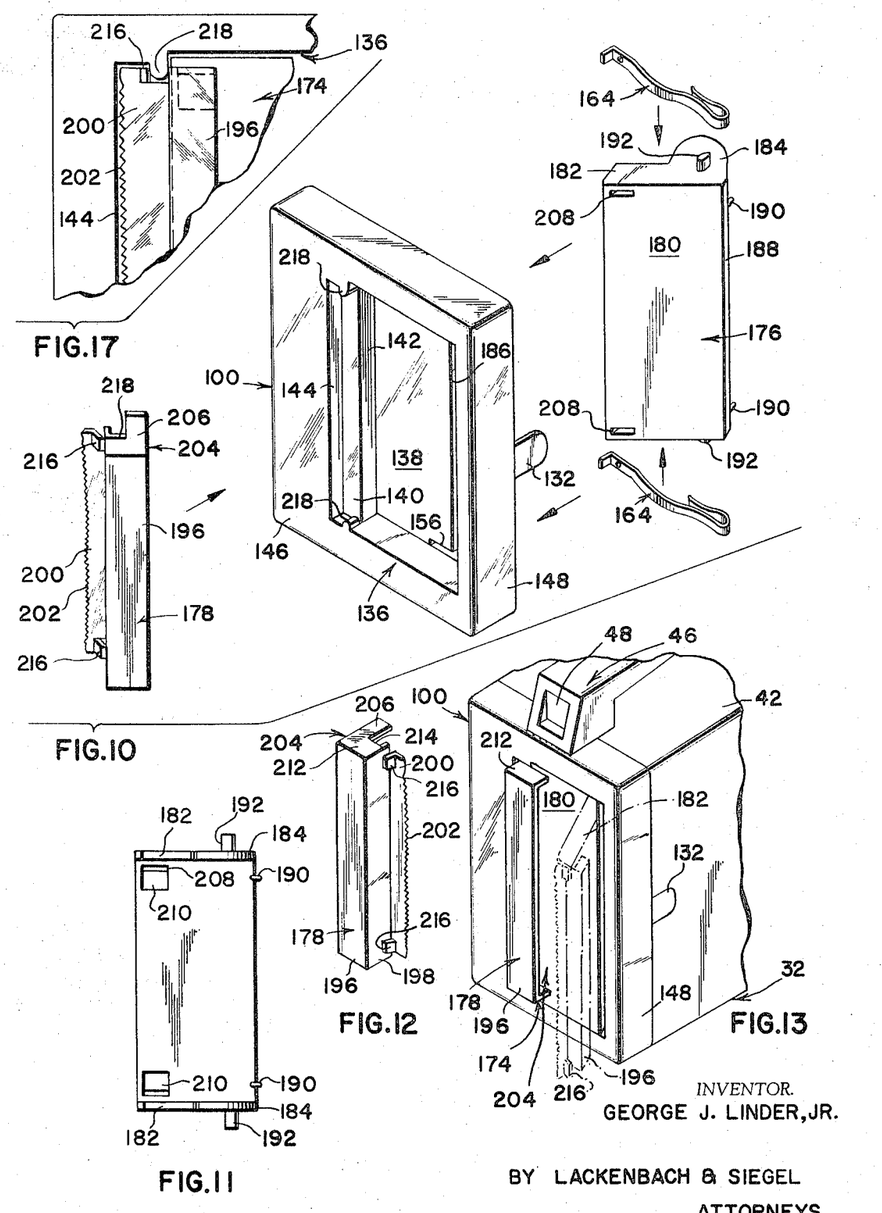
FIGURE 10 is an exploded perspective view of the access door for the photographic apparatus, illustrating the photosensitive material or film positioning or locating assembly that is operatively associated therewith.
FIGURE 11 is a bottom plan view of one of the elements of the film positioning or locating assembly.
FIGURE 12 is a perspective view of an other element of the film locating or positioning assembly.
FIGURE 13 is a perspective view of the photographic apparatus, broken away, with the access door in a closed position with respect thereto, and illustrating the film locating or positioning assembly in one of its positions with respect thereto in solid lines, and in an other of its positions in phantom.
FIGURE 17 is a detailed view, drawn to an enlarged scale, illustrating the manner in which certain elements of the film positioning or locating assembly cooperate with the access door.

With particular reference now to FIGURE 10, the door 100 will be seen to further comprise a recess, generally designated by the reference character 136. The recess 136 is defined by a first bottom wall 138, and a second bottom wall 140. The bottom walls 138 and 140 lie in different planes, and a first ledge 142 extends therebetween. A second ledge 144 extends from the bottom wall 140 to the exterior surface 146 of the access door 100. The first bottom wall 138 extends towards one end 148 of the access door (the end upon which the male closure element of the closure assembly 130 is mounted), and is separated therefrom by a wall 150, which comprises a plurality of vertically extending spaced apart grooves 152. One end of each of the grooves 152 defines a stop surface 154, the purpose of which will be described more fully hereinafter.

Figure 14:
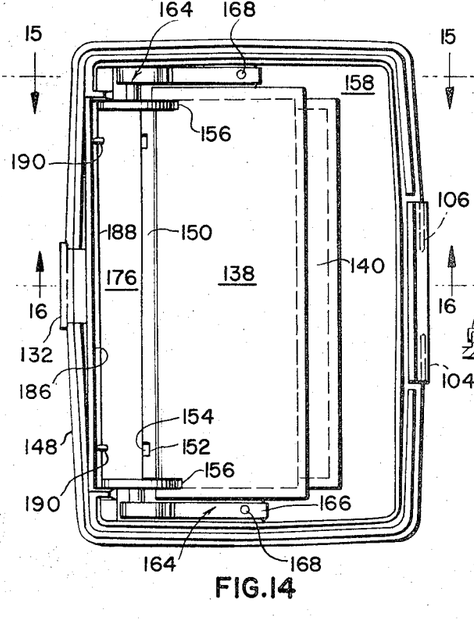
FIGURE 14 is a plan view of the interior of the access door.
Figure 15:
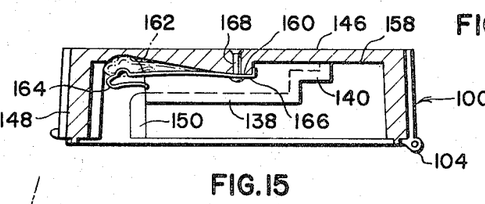
FIGURE 15 is a cross-sectional view taken along the line 15—15 of FIGURE 14.
Figure 16:
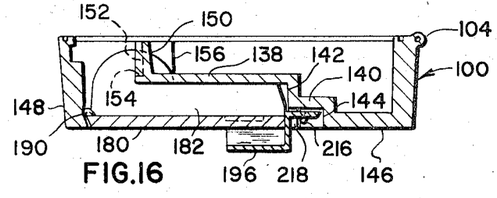
FIGURE 16 is a cross-sectional view taken along the line 16—16 of FIGURE 14.

The access door 100, at each end of the wall 150, is provided with a groove 156 which extends into the first bottom wall 138 (see FIGURES 10 and 14). The interior surface 158 of the door is provided with a mounting boss 160 on either side of the first bottom wall 138, which merges into a tapered bearing surface 162. A pair of resilient over-center floating assemblies generally designated by the reference character 164, to be described more fully hereinafter, are mounted within the door, one end 166 of each such assembly being fixedly positioned upon a corresponding one of the mounting bosses 160 in any suitable manner, as through the medium of a fastener 168. It will now be understood that each assembly 164 is connected only at one end thereof to the door 100 and, at the other end thereof, is free to move between and assume a plurality of substantially vertically spaced positions, one of which is illustrated in full in FIGURE 15, and the other one of which is illustrated in phantom in that figure.

Figure 18:
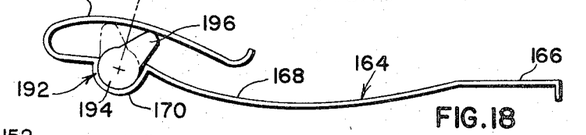
FIGURE 18 is an elevational view of one of the elements whereby the film positioning or locating assembly is operatively associated with the access door.

With particular reference now to FIGURE 18, each resilient over-center floating assembly 164 will be seen to comprise, further, a body portion 168 of curvilinear configuration, a positioning loop 170 of substantially semicircular configuration, and a camming loop 172 that is also of curvilinear configuration. Each of the resilient over-center floating assemblies 164 may be fabricated of any suitable material, and, for example, may be fabricated of a spring steel.

The photographic apparatus or camera 30 comprises, still further, a photosensitive material or film positioning or locating assembly, generally designated by the reference character 174. With particular reference now to FIGURES 10–13 and 17, the assembly 174 will be seen to comprise a film positioning or locating door 176 and a tear assembly 178 for severing successive portions of the photosensitive material or film 82 from one another. The film locating or positioning door 176 comprises a planar body 180 of generally rectangular configuration, and a plurality of arms 182. The arms 182 each comprise an ear 184, each of which, in turn, is particularly adapted to be disposed within a corresponding one of the grooves 156. With particular reference now to FIGURES 10 and 14, it will be understood that the height of each of the arms 182 is substantially the same as the distance from the exterior surface 146 of the door 100 to the first bottom wall 138, so that the exterior surface of the film locating or positioning door 176 will lie substantially flush therewith when the latter is in the position shown in full lines in FIGURE 13. Similarly, the transverse dimension of the door 176 is substantially the same as the distance between the ledge 142 and the inside surface 186 of the wall defining the end 148 of the door 100. As is clearly illustrated in FIGURE 14, a substantial portion of the door 176 lies within the space defined between the wall 150 and the inside surface 186. It is to be noted, at this point, that when the door 176 is in the position shown in full lines in FIGURE 13, the arms 182 are particularly adapted to rest upon the first bottom wall 138. As is now considered readily apparent, the door 176 is particularly adapted to be pivotably moved towards the position shown in phantom in FIGURE 13. Accordingly, an edge 188 of the door is particularly adapted to pivot towards the wall 150. The door 176 comprises, further, a plurality of tits 190 mounted on the door along the edge 188 thereof and, therefore, with the edge, are also particularly adapted to be pivoted towards the wall 150. The spacing between the tits 190 is the same as the spacing between the grooves 152, enabling the tits to enter a corresponding one of the grooves when the door is pivoted to the position shown in phantom in FIGURE 13. It will hereinafter be described in greater detail that each time the film locating or positioning door 176 is moved to the position shown in phantom in FIGURE 13, the photosensitive material or film 82 is positioned either to expose a portion thereof to a subject image, or to position a portion thereof that has been exposed to a subject image for development thereof. Accordingly, the position of the door 176 shown in phantom in FIGURE 13 can be denoted as a position for locating the photosensitive material or film 82. No movement of the film takes place when the door is in the position shown in full lines in that figure.

The door 176 further comprises a camming lug 192 that extends laterally outwardly from each of the ears 184. The camming lugs 192 are of generally key-hole shaped configuration, having a wide portion 194, and a narrow portion 196, as particularly illustrated in FIGURES 19–21. It will now be understood that the camming lugs 192 are each particularly adapted to be positioned within a corresponding one of the resilient over-center floating assemblies 164. More particularly, the wide portion 194 of the lugs is disposed within the positioning loop 170 of the assemblies 164, while the narrow portion 196 is particularly adapted to ride along the camming portion 172 thereof between the positions illustrated and in phantom lines in FIGURE 18. It will be noted that the full and phantom lines showings of the camming lug 192 in FIGURE 18, as well and the full and phantom-line showings of the assembly 164 in FIGURE 15, correspond with the same showings of the door 176 in FIGURE 13.

As hereinbefore pointed out, the resilient floating assemblies 164 are each constructed and arranged to define an over-center spring. Thus, the inherent degree of resiliency of each of the assemblies or springs, and the normal position of the camming portion 172 relative to the body portion 168, is chosen to enable the camming portion to exert a force against the narrow portion 196 of a magnitude sufficient to move the camming lugs to either of its positions once it has passed its center of movement. This center of movement may be defined by a line passed through the center of the lugs and perpendicular to a tangent of the camming portion 172. Accordingly, in moving the door 176 to its film locating position, it is only necessary to move the door to an extent sufficient to in turn move the camming lugs just past their center position. The floating springs 164 will then take over and move the door 176 the rest of the way. Once the door is in its film locating position, it will be maintained therein by the floating assemblies or springs 164. The reverse is similarly true.

As hereinbefore pointed out, the film locating or positioning assembly 174 comprises a tearing assembly 178 for severing successive portions of the photosensitive material or film 82. With particular reference now to FIGURES 10, 12, 13 and 17, the tearing assembly or tear strip 178 will be seen to comprise a top wall 196, a front wall 198 and a tear strip 200 having a serrated edge 202. The tearing assembly 178 further comprises a plurality of side walls 204 which are each of generally L-shaped configuration. One leg 206 of each side wall is particularly adapted to function as a tab. More particularly, the legs or tabs 206 are insertable through slots 208 of the body portion 180 of the door 176. The legs or tabs 206 are then folded towards one another, and are particularly adapted to be disposed within recesses 210 provided in the under surface of the body portion 180. The tabs 206 are not fixed within the recesses 210, there resulting some play between the tearing assembly 178 and the door 176, the purpose of which will be described more fully hereinafter.

The other leg 212 of each of the side walls 204 defines an edge 214 which, when the tabs 206 have been inserted through the slots 208 and turned or folded into the recesses 210, are particularly adapted to rest upon the surface of the body portion 180 of the door 176, as particularly illustrated in FIGURE 13. The dimension of the front wall 198 is then chosen to dispose the tear strip 200 substantially adjacent the second bottom wall 140.

With particular reference now to FIGURES 10, 12 and 17, the tear strip 200 will be seen to comprise a plurality or pair of reverse projections 216 at each end thereof. The terminology "reverse" is intended to mean that the projections 216 extend upwardly from the plane of the tear strip 200, at an obtuse angle with respect thereto, towards the front wall 198. These projections are particularly adapted to engage or co-operate with a corresponding one of a pair or plurality of beads 218 which extend inwardly towards one another from the walls of the recess 136 in the door 100 (see FIGURE 10). As clearly shown in FIGURE 17, when the door 176 and the tearing assembly 178 is in the position in which a portion of the photosensitive material or film 82 is being subjected to an image, or an exposed portion is being developed (shown in full lines in FIGURE 13), the tear strip 200 will be disposed or located substantially adjacent the second bottom wall 140, as pointed out above. Accordingly, the projections 216 will be disposed or located in a position in which they are engageable with the beads 218. It was hereinbefore pointed out that the connection between the door 176 and the tearing assembly 178 provides for some play therebetween. When it is desired to move the door 176 and the tearing assembly 178 to the film locating position, it is necessary to grasp the tearing assembly in such a manner as to exert a force upon the tear strip 200 that will tend to move, or, in effect, pivot the projections 216 away from beads 218. Any other force will simply enable the projections to engage the beads 218, thus precluding the door 176 and the tearing assembly 178 from inadvertently being moved to that position. The tearing assembly thus performs the additional function of locking the door 176 and the tearing assembly 178 in the position in which the film either is being exposed to a subject image, or an exposed portion thereof is being developed.

With particular reference now to FIGURES 1, 4 and 5, it will be understood that when the cartridge 34 is disposed within the housing 32, the photosensitive material or film 82 will exit from the cartridge through an exit slot 220 which is in alignment with the space defined between the wall 150 and the inner surface 186 when the door 176 is in a position in which the film is either being exposed to a subject image, or an exposed portion thereof is being developed (shown in full lines in FIGURE 13). It is for this reason, that, as hereinbefore pointed out, photographic apparatus or the camera 30 constructed in accordance with the principles of the present invention is virtually self-threading. It will further be understood that, once the film 82 has entered this space, it is turned so that it will traverse the bottom walls 138 and 140, and thence will exit the camera between the second ledge 144 and the tear strip 200.

Figure 19:
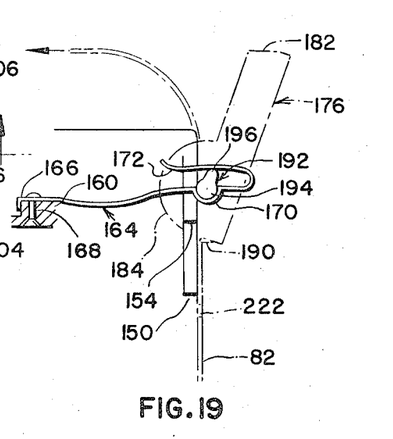
FIGURES 19 through 21 are schematic views illustrating the manner in which the film positioning or locating assembly cooperates with the film or photosensitive material.
Figure 20:
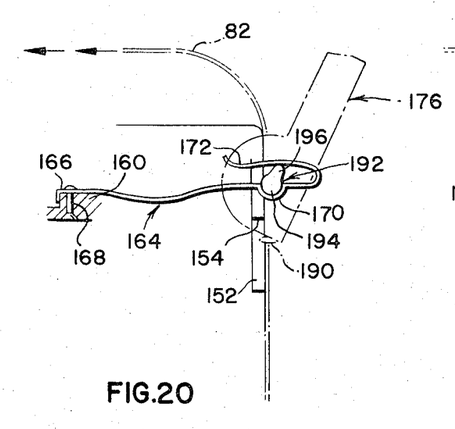
Figure 21:
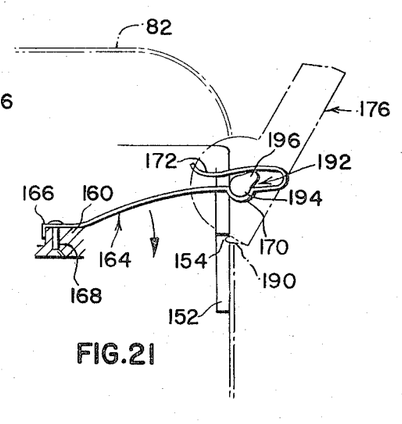

It has hereinbefore been pointed out that the door 176 and the tearing assembly 178 comprise a film locating or positioning assembly. With particular reference now to FIGURES 19-21, and assuming that the cartridge 34 has been inserted within the housing 32, and the access door 100 moves to a closed position, as clearly illustrated in FIGURE 13, it is necessary to move the film locating assembly to a film locating position in order to bring the first portion of the film to a position upon the image plane 80. The door 176 is thus pivoted or moved to the position shown in FIGURE 19 by grasping the tearing assembly 178 in the manner hereinbefore set forth. As the door is pivoted to this position, the cam 192 will pass its center position, enabling the camming portion 172 to bear against the narrow portion 196 and maintain the door 176 in this position. In so moving the door, the tits 190 will have been pivoted to a position in which they rest upon a film leader that is presented when the door 176 is, in effect, first opened. The film leader can now be grasped, and the film 82 pulled or moved to a position in which a first pair or plurality of apertures 222 are in alignment with the tits 190. Due to the tension of the camming portion 172, a further movement of the door 176 to a film locating position (clockwise as viewed in FIGURE 19) will take place, thus causing the tits 190 to pass through the apertures 222 and into the grooves 152 in the wall 150, as clearly illustrated in FIGURE 20. The user continues to pull the film leader, during which movement the door 176 will move in a vertical direction as shown in that figure, and the tits 190 will ride within the grooves 152 until they engage or bottom-out upon the surface 154. This movement of the door can take place since the over-center assemblies 164 are inherently resilient, and are fixedly mounted within the access door 100 only at the mounting bosses or surfaces 160. The fasteners 168 thus, in effect, become a fulcrum point about which the assemblies 164 pivot when the door 176 is pulled in the aforesaid direction by the film 82. The resilient over-center assemblies 164 are thus floating assemblies, as hereinbefore pointed out, and are movable between a normal position illustrated in FIGURES 19 and 20, and shown in phantom in FIGURE 15, and a flexed position, clearly illustrated in FIGURE 21. It is in this latter position that the door 176 has been pulled along with the film 82 until the tits 190 have bottomed-out upon the surface 154 of the grooves 152. It will now be understood that the resilient floating assemblies 164 tend to bias the door 176 to its normal position, and must therefore be flexed in order to allow the door 176 to be moved to the position shown in FIGURE 21. This latter position is not only defined by the engagement between the tits 190 and the surface 154 of the grooves 152, but also by engagement of the body portion 168 of each of the floating assemblies 164 with the bearing surface 162 (see FIGURE 15) of the access door 100.

A first successive portion of the photosensitive material or film 82 is now positioned at the image plane 80 of the cartridge 34, and is particularly adapted to be exposed to a subject image in a manner that is considered readily apparent to those skilled in the art. The film locating and positioning assembly 176 is now pivoted or moved to the position shown in full lines in FIGURE 13. In this position and as hereinbefore pointed out, the tearing assembly 178 will lock the door 176 against being inadvertently opened because of the engagement between the reverse projections 216 and the beads 218. After this first successive portion of the film has been exposed, it is necessary to move it into the liquid-type chamber of the cartridge 34 that contains the requisite developing solution or solutions.

The tearing assembly 178 is now grasped in the manner aforesaid (to preclude engagement between the projections 216 and the beads 218 at this time), and the door 176 once again moved to the position shown in FIGURE 19. At this point, it is to be noted that when the door 176 was closed, the floating assemblies 164 moved the door towards the bottom wall 138 (vertically downwardly in the schematic illustrations of FIGURES 19–21) due to the biasing force exerted thereagainst. As a result, when the door 176 is once again moved to a film locating position, the tits 190 will have been pivoted to a location in which they once again rest upon the film 82 just behind the first set of locating apertures 222. It can readily be seen that in the absence of this floating movement of the door 176 the tits 190 would tend to reenter the same set of locating apertures 222 from which they are disengaged each time the door is moved to its closed position. This floating movement of the door occurs in two phases: in the first phase, after the tits 190 are engaged within a set or pair of locating apertures 222, the door is moved or floated away from the bottom wall 138; in the second phase, when the door is pivoted to a closed position and the tits 190 are disengaged from the locating apertures 222, the door floats or moves towards the bottom wall 138, and thus returns to its normal position. It is emphasized that when the door is again moved or pivoted to a film locating position, the tits 190 are pivoted to a position in which they again bear upon the film 82 at a location just behind the set of locating apertures 222 from which they were previously disengaged. Such a set of apertures 222 is illustrated in FIGURE 19 in phantom. It is also to be noted that each set of locating apertures 222 will be positioned at the surface 154 of the grooves 152 when the door 176 is to be moved to a closed position, and the tits 190 disengage therefrom. The door is maintained in each of its positions by the camming portion 172 of the floating assemblies 164, and is actually urged to each of these positions by the camming portion once the cams 192 have passed their center position, as hereinbefore pointed out.

A first portion of the film 82 has now been exposed, it is ready to be moved into the liquid-type developing chamber of the cartridge 34, and the door 176 has been pivoted or moved to a film locating position (see FIGURE 19), in which position the tits 190 have been pivoted to a location in which it bears upon the film just behind the first set of locating apertures 222 which was responsible for such first portion of the film at the image plane 80. The user again pulls on the film until the next set of locating apertures 222 is in alignment with the tits 190, whence the latter enter the apertures and the grooves 152. The user continues to pull the film, thus pulling the door therewith, and causing it to float away from the bottom wall 138. During this floating movement of the door, the tits 190 ride within the grooves 152 until they once again bottom-out upon the surface 154 thereof. At this time, the exposed portion of the film will be located within the liquid-type developing chamber of the cartridge 34. It is necessary to now close the door 176. As the door is pivoted to its closed position, it will float towards the bottom wall 138 and return to its normal position with respect thereto under the biasing action of the floating assemblies 164. The user now waits the required time for the exposed portion of the film to be developed. It is to be understood that during this time an exposable portion of the film 82 is not located upon the image plane 80 of the cartridge 34. The required time for the developing having expired, the door 176 is again moved to a film locating position, and the tits 190 pivoted to a location just behind the set of locating apertures 222 from which they have previously been disengaged. The film is pulled by the user, and the developed portion of the film severed by means of the tear strip 200 in a manner that is considered readily apparent to those skilled in the art. In removing the developed portion of the film and severing it, the next successive portion of the film capable of being exposed to a subject image is moved into position upon the image plane 80 and is properly located by means of the next set of locating apertures 222. The door 176 is again closed, and the procedure repeated until all of the available exposable portions of the film 82 have been exposed to a subject image and developed. At such time, the access door 100 is opened, in a manner considered readily apparent to those skilled in the art, and the used cartridge 34 removed from the enclosure 32. The used cartridge can now be disposed, and a new cartridge positioned in its place.

The photosensitive material or film 82 will thus be seen to comprise a plurality of sets of locating apertures 222. It can be said that two different types of locating apertures are provided. One such type is to locate an exposable portion of the film upon the image plane 80. The other type can be said to locate the exposed portion of the film in the liquid-type developing chamber of the cartridge 34. It is to be remembered that when an exposed portion of the film is located in the developing chamber, the next successive exposable portion thereof has not yet been located upon the image plane. Accordingly, the next set of locating apertures 222 will be of the first type, and the following set of the second type.

It is again emphasized that the floating assemblies 164 are not only responsible for maintaining the door 176 in each of its positions, but actually urge it to these positions once the cams 192 have passed their center position. In connection with the door 176, and as hereinbefore pointed out, it is movable to a position in which it locates or positions the film 82 for each of the hereinbefore described purposes. This position can, for purposes of simplicity, be described as an "open" position with respect to the access door 100. The door 176 is also movable to another position in which a successive portion of the film is either being exposed to a subject image, or an exposed portion thereof is being developed. This latter position of the door 176 can, for purposes of simplicity, be described as a "closed" position with respect to the access door 100. In addition, and as hereinbefore pointed out, the resilient over-center floating assemblies 164 enable the door to "float" towards the bottom wall 138, or a normal or operative position. In this position, the door is capable of performing its function of properly locating the film 82. The floating assemblies 164 also enable the door to float away from the bottom wall 138, towards an inoperative position. During this latter movement, the door will be performing its function. Once it has reached its inoperative position, the film will have been properly located, and the door can be moved no further until it is returned to its normal or operative position.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. Photographic apparatus for exposing successive portions of a photosensitive material to a subject image, and developing each such portion prior to locating the next such portion in a position for exposure to the same or another such image completely within said apparatus comprising, in combination, a housing having:
  a front end and a rear open end and unobstructed end; and
  at least a top wall and first and second side walls;
a lens and shutter system mounted on said housing at the front end thereof having:
  a top wall lying in the same plane and being flush with the top wall of said housing;
a handle and view-finding assembly comprising:
  a rear-view finder mounted on the top wall of said enclosure at the rear end thereof; and
  a front view finder in alignment with said rear-view finder mounted on the top of said lens and shutter assembly;
an access door removably and pivotally mounted on said housing at the rear open and unobstructed end thereof; said access door comprising:
  an internal surface and an external surface; said internal surface having:
    a plurality of mounting bosses and a corresponding number of bearing portions, each of said mounting bosses and bearing portions being disposed adjacent a side wall of said access door;
    a plurality of end walls;
  the side walls and the end walls of said access door defining a recess extending from the external surface towards the internal surface thereof, said recess in part being defined by:
    a first bottom wall and a second bottom wall;
    a first ledge extending between said first and second bottom walls, and a second ledge extending between said second bottom wall and the external surface of said access door;
    a plurality of heads extending outwardly of said second bottom wall towards the internal surface of said door substantially at said first ledge and in a direction towards one another;
  said first bottom wall having a lip extending along an end thereof towards the internal surface of said internal surface, said lip being spaced from the adjacent end wall of said access door to define a space therebetween, and comprising:
    a plurality of grooves extending towards said first bottom wall each having a stop surface; and
    a channel in said first bottom wall at each end of the lip extending towards said first ledge;
a mounting assembly for removably and pivotally mounting said access door on said housing, and comprising:
  a boss positioned on said door and extending therefrom, said boss having:
    a recess at each end thereof;
    a resilient element of generally trapezoidal configuration in an unflexed condition, and comprising:
      a plurality of legs each having a finger at one end thereof insertable within the recesses of the boss, and a raised portion extending from the plane in which said element lies; and
      a bight extending from the plane in which said element lies in the same direction as said raised portions;
  a channel in the first wall of said housing within which said resilient element is disposable, and having:
    top and bottom walls engageable with the legs of said element to flex them towards one another; and
    an end wall;
  a panel extending across said channel and defining a side wall thereof engageable with the raised portions of the legs;
  said panel being spaced from the end wall of the channel to define a space within which the bight of said element is disposable;
a closure assembly for removably maintaining said access door in a closed position with respect to the housing at the rear open and unobstructed end thereof, and comprising:
  a male closure element positioned upon the access door; and
  a female closure element positioned upon the exterior surface of the second wall of said housing;
an image transfer assembly fixedly positioned within said housing for transferring a virtual image to a photosensitive material, and comprising:
  a mounting wall of generally U-shaped configuration having a plurality of mounting ears;
  a plurality of side walls of generally triangular configuration, each of said walls having a positioning lug extending laterally outwardly therefrom;
an image transfer wall extending from said mounting wall at an acute angle of 45 degrees therewith, and having:
  an opening of generally trapezoidal configuration; and
  an image transfer element positioned upon said image transfer wall presenting a substantial portion of its surface area through said opening, and having:
    a backing of non-reflective material on another surface thereof;
said side walls and said image transfer wall being constructed and arranged, along an edge thereof, to present a ledge of generally U-shaped configuration;
said image transfer assembly being disposed in said housing to position said image transfer wall and element at an acute angle of 45 degrees with respect to the second wall thereof, enabling said image transfer element to reflect rays of actinic light transferred thereto by said lens and shutter assembly laterally towards said second wall perpendicularly with respect thereto, further enabling a virtual image to be transferred towards said second wall;
a removable unitary self-contained disposable cartridge positioned within said housing in a cooperative relationship with said image transfer assembly, and comprising:
  a supply of photosensitive material;
  said photosensitive material having successive sets of locating apertures of a plurality of different types, one of said types being adapted to position a portion of the material at an image plane across which it is traversable for exposure to a subject image, and another type being adapted to position the exposed portion of the material in a liquid-tight developing chamber disposed between the image plane and an opposite substantially planar bottom surface of the cartridge before the next portion capable of being exposed is located at the image plane;
  a plurality of side walls each having:

a plurality of guiding ears extending laterally from the side walls towards one another;

said ears being adapted to guide said material as it traverses the image plane, and being engageable with the side walls of said image transfer assembly when the cartridge is disposed in cooperative relationship therewith;

the lugs of said image transfer assembly and the ears of said cartridge being engageable with one another when the assembly and cartridge are disposed in said relationship with one another, and the spacing between the lugs and the edges of the side walls of said assembly being chosen to define a passage for the photosensitive material between the ledge and said image plane, said ledge being in virtual contact with said material to maintain it flat as it traverses the image plane; and an exit slot for said photosensitive material at the rear of said cartridge adapted to be disposed in alignment with the space between the lip and the end wall of said access door when the latter is in a closed position with respect to said housing;

the second wall of said housing having a resilient element mounted thereon for bearing against the bottom surface of said cartridge and urging the ears into engagement with said lugs, enabling the cartridge to function as a pressure plate and, in conjunction with the ledge, maintain said material flat at it traverses the image plane;

a plurality of resilient over-center floating assemblies mounted within said access door adjacent a corresponding one of the side walls thereof, and comprising:

a mounting portion fixedly positioned upon the mounting bosses;

a curvilinear body portion extending from the mounting portion towards the space in said access door;

a positioning loop; and a camming portion;

a floating photosensitive material or film locating assembly positioned to cooperate with said access door, and comprising:

a floating door having;

a planar body;

a plurality of tits engageable with successive sets of alternately different types of said locating apertures mounted on said body along an edge thereof at an obtuse angle with respect thereto;

a plurality of slots in said body portion;

a plurality of arms each having an ear of semicircular configuration; and a camming lug extending outwardly of each of said ears of generally key-hole-shaped configuration, said camming lugs each having:

a wide portion particularly adapted to dispose in the positioning loop of a corresponding one of said resilient over-center floating assemblies, and a narrow portion adapted to engage and move along the camming portion thereof;

said ears being positionable within the channels in said first bottom wall;

said resilient floating assemblies exerting a biasing force against the floating door tending to normally dispose the door in a position in which the arms substantially rest upon the first bottom wall;

said floating door being pivotally movable between a closed position with respect to said access door, and an open or film locating position with respect thereto;

the edge of said door, as the latter is pivoted to its open position, pivotally moving towards the lip of said first bottom wall, enabling the tits to enter the grooves thereof, subsequent to their engagement with said locating apertures, and as the pivoting movement of the door continues, further enabling the tits to move along said grooves and bottom-out on the stop surface thereof;

the engagement of said tits with said locating apertures as the photosensitive material is grasped and pulled from the space in said access door, and along the first and second bottom walls, enabling a force to be exerted on the floating door of sufficient magnitude to overcome the biasing force of said resilient assemblies, further enabling the door to float towards the external surface of said access door until the tits bottom-out and the body portion of said assemblies bears against the bearing portion of the internal surface thereof;

said resilient floating assemblies maintaining the floating door in each of its positions with respect to the access door, and urging the floating door towards each of such positions once the narrow portion of the camming lugs pass their center of movement along the camming portion of said assemblies; and a tearing assembly positioned in cooperative relationship with said floating door; and comprising:

a top wall having:

a plurality of side walls each being defined by:

a tab insertable within the slots in the body of said floating door, and adapted to be turned towards one another subsequent to insertion therewithin; and a leg having an edge bearing upon the body of said floating door;

a front wall perpendicular to said top wall; and a tear strip lying in a plane parallel with the plane in which the top wall lies, said tear strip having:

a serrated edge; and a reverse projection engageable with the beads on said access door when the floating door has been pivotally moved to a closed position with respect thereto, in which position the tear strip will be disposed substantially adjacent the second bottom wall and between the first and second ledges;

the cooperative relationship between the tearing assembly and said floating door presenting play therebetween, enabling said reverse projections to engage the beads and lock the door in its closed position until the tearing assembly is grasped in a manner to, in effect, pivot it in a direction to effect disengagement therefrom.

2. Photographic apparatus for exposing successive portions of a photosensitive material to a subject image, and developing each such portion prior to locating the next successive portion in a position for exposure to the same or another such image completely within said apparatus comprising, in combination:

a housing;

an access door removably and pivotally mounted on said housing;

a mounting assembly for removably and pivotally mounting said access door on said housing;

an image transfer assembly fixedly positioned within said housing for transferring a virtual image to a photosensitive material;

a removable unitary self-contained disposable cartridge positioned within said housing in a cooperative relationship with said image transfer assembly, and comprising:

a supply of photosensitive material;

a floating photosensitive material or film locating assembly positioned to cooperate with said access door;

a plurality of resilient over-center floating assemblies for mounting said floating door in a floating relationship with said access door; and a tearing assembly positioned in cooperative relationship with said floating door for severing the successive portions of said photosensitive material subsequent to the development of each such portion.

3. Photographic apparatus as defined in claim 2, wherein said image transfer assembly comprises:

a plurality of side walls each having a positioning lug extending therefrom;

an image transfer wall having an opening;

and an image transfer element positioned upon said image transfer wall presenting a substantial portion of its surface area through said opening;

said side walls and said image transfer wall being constructed and arranged to present a ledge.

4. Photographic apparatus as defined in claim 3, wherein said cartridge comprises:

a plurality of side walls each having:

a plurality of guiding ears extending therefrom towards one another;

said ears being adapted to guide said material as it traverses an image plane for exposure to a subject image, and being engageable with the side walls of said image transfer assembly when the cartridge is disposed in cooperative relationship therewith;

the lugs of said image transfer assembly and the ears of said cartridge being engageable with one another when the assembly and cartridge are disposed in their cooperative relationship.

5. Photographic apparatus as defined in claim 4, wherein:

the spacing between the lugs and the ledge is chosen to define a passage for the photosensitive material between the ledge and the image plane, said ledge being in virtual contact with said material to maintain it flat as it traverses the image plane.

6. Photographic apparatus as defined in claim 5, wherein said photosensitive material comprises:

successive sets of locating apertures of a plurality of different types, one of said types being adapted to position a portion of the material at said image plane, across which it is traversable for exposure to a subject image, and another type being adapted to position the exposed portion of the material in a developing chamber of the cartridge before the next portion capable of being exposed is located at the image plane.

7. Photographic apparatus as defined in claim 6, wherein there is provided:

a resilient element for bearing against said cartridge and urging the ears into engagement with said lugs, enabling the cartridge to function as a pressure plate, and, in conjunction with the ledge, maintain said photosensitive material flat as it traverses the image plane.

8. Photographic apparatus as defined in claim 7, wherein said access door comprises:

a recess being defined at least in part by:

a plurality of bottom walls;

one of said bottom walls having a lip extending along an end thereof, and being spaced from the access door to define a space therebetween particularly adapted to be disposed in alignment with an exit slot for the photosensitive material in the cartridge when the access door is in a closed position with respect to said housing.

9. Photographic apparatus as defined in claim 8, wherein the lip of said one bottom wall comprises:

a plurality of grooves extending towards said bottom wall and having a stop surface.

10. Photographic apparatus as defined in claim 9, wherein said floating photosensitive material or film locating assembly comprises:

a floating door having a plurality of tits engageable with successive sets of alternately different types of said locating apertures;

a plurality of arms each having an ear of semi-circular configuration; and a camming lug extending outwardly of each of the ears.

11. Photographic apparatus as defined in claim 10, wherein:

said access door further comprises a channel in said one bottom wall at each end of the lip;

the ears of said floating door being positionable within the channels in said one bottom wall; wherein, said resilient over-center floating assemblies comprise:

a positioning loop; and a camming portion; and wherein, said camming lugs comprise:

a portion particularly adapted to be disposed in the positioning loop of a corresponding one of said resilient over-center floating assemblies, and another portion adapted to engage and move along the camming portion thereof;

said resilient floating assemblies exerting a biasing force against the floating door tending to normally dispose it in a position in which the arms thereof substantially rest upon said one bottom wall;

said floating door being pivotally movable between a closed position with respect to said access door, and an opened or film locating position with respect thereto;

said tits, as the floating door is pivoted to its opened position, being pivotally moved towards the lip of said one bottom wall, enabling them to enter the grooves thereof subsequent to engagement with said locating apertures, and as the pivoting movement of the door continues, further enabling the tits to move along said grooves and bottom-out on the stop surface thereof;

the engagement of said tits with the locating apertures as the photosensitive material is grasped and pulled from the space in said access door, and along said one bottom wall, enabling a force to be exerted on the floating door of sufficient magnitude to overcome the biasing force of said resilient assemblies, further enabling the door to float away from said one bottom wall until the tits bottom-out on the stop surfaces;

said resilient floating assemblies maintaining the floating door in each of its positions with respect to the access door, and urging the floating door towards each of such positions once the other portion of said camming lugs pass their center of movement along the camming portion of said assemblies.

12. Photographic apparatus as defined in claim 11, wherein said access door further comprises:

an internal surface and an external surface;

said internal surface having:

a plurality of mounting bosses and a corresponding number of bearing portions, each of said mounting bosses and bearing portions being disposed substantially adjacent a side wall of said access door;

a plurality of end walls;

the side walls and the end walls of said access door defining said recess therein which extends from said external surface towards the internal surface thereof; and wherein:

said resilient over-center floating assemblies further comprise:

a mounting portion fixedly positioned upon the mounting bosses; and a curvilinear body portion extending from the mounting portion towards the space in said access door.

13. Photographic apparatus as defined in claim 12, wherein:

said access door further comprises a first ledge extending between said plurality of bottom walls, and a second ledge extending between another of said bottom walls and the external surface of said access door; and a plurality of beads extending outwardly of said other bottom wall towards the external surface of said access door substantially at said first ledge and in a direction towards one another, and wherein said floating material locating assembly further comprises:

a tearing assembly postioned in cooperative relationship with said floating door, and comprising:

a top wall having a plurality of side walls each being defined by a tab insertable within a corresponding one of a plurality of slots provided in said floating door, and adapted to be turned towards one another subsequent to insertion therewithin; and a tear strip having a serrated edge; and a reverse projection engageable with the beads on said access door when the floating door has been pivotally moved to a closed position with respect thereto, in which position the tear strip will be disposed substantially adjacent said other bottom wall and between the first and second ledges;

the cooperative relationship between the tearing assembly and said floating doors presenting play therebetween, enabling said reverse projections to engage the beads and lock the door in its closed position until the tearing assembly is grasped in a manner to, in effect, pivot it in a direction to effect disengagement therefrom.

14. Photographic apparatus as defined in claim 13, wherein said image transfer assembly further comprises:
a mounting wall; and wherein:

said image transfer wall extends from said mounting wall at an acute angle with respect thereto;

said image transfer assembly being disposed in said housing to position said image transfer wall and element at an acute angle with respect to a wall of said housing, enabling said image transfer element to reflect rays of actinic light transferred thereto laterally towards the said wall, further enabling a virtual image to be transferred thereto, 15. Photographic apparatus as defined in claim 14, wherein said floating door comprises:

a body having an edge along which said tits are disposed at an obtuse angle with respect thereto.

16. Photographic apparatus as defined in claim 15, wherein said housing comprises:

a front end and a rear opened and unobstructed end at which said access door is removably and pivotally mounted;

at least a top wall;

a lens and shutter system mounted on said housing at the front end thereof having;

a top wall lying in substantially the same plane as the top wall of said housing;

a handle and view-finding assembly comprising:

a rear view-finder mounted on the top wall of said enclosure at the rear end thereof; and a front view-finder in alignment with said rear view-finder mounted on the top wall of said lens and shutter assembly.

17. Photographic apparatus as defined in claim 16, wherein, said mounting assembly for removably and pivotally mounting said access door on the housing comprises:

a boss positioned on said door having a plurality of recesses;

a resilient element comprising a plurality of lugs each having a finger at one end thereof insertable within the recesses of the boss, and a raised portion extending from the plane in which said element lies; and a bight extending from the plane in which said element lies in the same direction as said raised portions;

a channel in an other wall of said housing within which said resilient element is disposable, and having:

top and bottom walls engageable with the lugs of said element to flex them towards one another; and an end wall;

a panel extending across said channel and defining a side wall thereof engageable with the raised portions of the lugs;

said panel being spaced from the end wall of said channel to define a space within which the bight of said element is disposable.

18. In combination with a removable unitary self-contained disposable cartridge, having a supply of photosensitive material, particularly adapted to be removably disposed within the housing of a photographic apparatus for exposing successive portions of said material to a subject image, and developing each such portion prior to locating the next such portion in a position for exposure to the same or another such image completely therewithin, said cartridge comprising:

an image plane particularly adapted to be traversed by said photosensitive material; and a plurality of side walls each having a plurality of guiding ears;

an image transfer assembly disposable in cooperative relationship with said cartridge for transferring a virtual image to said photosensitive material, and comprising:

a plurality of side walls each having a positioning lug;

an image transfer wall having an opening; and an image transfer element positioned upon said image transfer wall presenting a substantial portion of its surface area through said opening;

said ears being adapted to guide said material as it traverses the image plane, and being engageable with the side walls of said image transfer assembly when the cartridge is disposed in cooperative relationship therewith;

the lugs of said image transfer assembly and the ears of said cartridge being engageable with one another when the assembly and cartridge are disposed in said cooperative relationship.

19. The combination as defined in claim 18, wherein: an edge of the side walls and an edge of said image transfer wall being constructed and arranged to define a ledge; and wherein:

the spacing between the lugs and the edge of the side walls is chosen to define a passage for the photosensitive material between the ledge and said image plane;

said ledge being in virtual contact with said material to maintain it flat as it traverses the image plane.

20. The combination as defined in claim 19, wherein: said image transfer assembly further comprises:

a mounting wall; wherein:

the side walls thereof are of generally triangular configuration; and wherein:

said image transfer wall extends from said mounting wall at an acute angle therewith; enabling said image transfer assembly to reflect rays of actinic light transferred thereto generally laterally towards the image plane of said cartridge, further enabling a virtual image to be transferred thereto.

21. The combination as defined in claim 20, wherein there is further provided:

a resilient element bearing against said cartridge for urging the ears into engagement with said lugs, enabling the cartridge to function as a pressure plate, and in conjunction with the ledge, maintain said material flat as it traverses the image plane.

References Cited

UNITED STATES PATENTS 3,053,160 9/1962 Bachelder et al. ____ 95—13 XR
3,113,497 12/1963 Eloranta ______________ 95—13

NORTON ANSHER, *Primary Examiner.*

JOHN M. HORAN, *Examiner.*

G. M. HOFFMAN, *Assistant Examiner*